(12) United States Patent
Klein et al.

(10) Patent No.: US 6,295,548 B1
(45) Date of Patent: Sep. 25, 2001

(54) DETECTION OF AN IMPORTED TRANSACTION FOR FINDING THE GLOBAL TRANSACTION IDENTIFIER

(75) Inventors: Johannes Klein, San Francisco; Albert C. Gondi, Santa Clara; Roger J. Hansen, San Francisco, all of CA (US); Sitaram V. Lanka, Mercer Island, WA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/267,844

(22) Filed: Mar. 12, 1999

(51) Int. Cl.[7] .................................. G06F 9/00; G06F 17/00
(52) U.S. Cl. .......................... 709/101; 707/10; 707/200; 707/511
(58) Field of Search ............................. 707/10, 200, 511; 709/101, 203

(56) References Cited

U.S. PATENT DOCUMENTS

| | | | |
|---|---|---|---|
| 4,228,496 | 10/1980 | Katzman et al. | 364/200 |
| 4,817,091 | 3/1989 | Katzman et al. | 371/9 |
| 5,319,774 | * 6/1994 | Ainsworth et al. | 714/20 |
| 5,504,899 | * 4/1996 | Raz | 707/10 |
| 5,504,900 | * 4/1996 | Raz | 707/10 |
| 5,680,610 | * 10/1997 | Smith et al. | 707/10 |
| 5,751,932 | 5/1998 | Horst et al. | 395/182.1 |
| 5,835,766 | * 11/1998 | Iba et al. | 709/104 |
| 5,920,863 | * 7/1999 | McKeehan et al. | 707/10 |
| 5,923,833 | * 7/1999 | Freund et al. | 707/202 |
| 6,101,527 | * 8/2000 | Lejeune et al. | 709/201 |
| 6,115,711 | * 9/2000 | White | 707/10 |
| 6,205,464 | * 3/2001 | Cobb et al. | 709/101 |
| 6,209,038 | * 3/2001 | Bowen et al. | 709/238 |

OTHER PUBLICATIONS

Jim Gray, et al.; Transaction Processing: Concepts and Technique; Morgan Kauffman; 1993; pp. v–xxxii.

* cited by examiner

*Primary Examiner*—Krisna Lim
(74) *Attorney, Agent, or Firm*—Leah Sherry; Oppenheimer, Wolff & Donnelly LLP

(57) ABSTRACT

Systems and methods for ensuring that two different subordinate transactions will not be created at any given transaction processing node for the same parent transaction. Upon receiving a work request from a remote transaction processing system, the local transaction manager creates a local subordinate transaction associated with the parent transaction. A local transaction identifier that identifies the local subordinate transaction is also created. The local identifier includes an indicator, such as a one-bit flag, which identifies the local subordinate transaction as an imported transaction. The global identifier for the parent transaction is stored to a map in association with the transaction identifier of the new local subordinate transaction. If a work request associated with an imported transaction is sent to a remote transaction processing system, the global transaction identifier of the parent transaction is retrieved from the map and included in the work request so that the receiving system will know that the work request is associated with the parent transaction. In this manner, the receiving system will know not to start a new subordinate transaction on behalf of the parent transaction if a transaction subordinate to the parent transaction has already been started on that system.

15 Claims, 2 Drawing Sheets

US 6,295,548 B1

DETECTION OF AN IMPORTED TRANSACTION FOR FINDING THE GLOBAL TRANSACTION IDENTIFIER

CROSS REFERENCE TO RELATED APPLICATIONS

This Application is related to of U.S. application Ser. Nos. 09/267,422, 09/267,032, 09/267,460 filed Mar. 12, 1999, Mar. 11, 1999, and Mar. 12, 1999, respectively.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates generally to transaction processing, and more particularly to techniques for marking a transaction as an imported transaction, and including information about the parent transaction when exporting a transaction branch for the imported transaction. The techniques of the present invention are useful to ensure that two different subordinate transactions will not be created at any given transaction processing node for the same parent transaction.

A transaction is most often defined as an explicitly delimited operation, or set of related operations, that change or otherwise modify the content of an information collection (e.g., database or databases) from one consistent state to another. Changes are treated as a single unit in that all changes of a transaction are formed and made permanent (the transaction is "committed") or none of the changes are made permanent (the transaction is "aborted"). If a failure occurs during the execution of a transaction, resulting in the transaction being aborted, whatever partial changes were made to the collection are undone to leave it in a consistent state.

A transaction processing system typically includes a transaction manager; a collection of subsystems, called resource managers (RMs), which are essentially abstractions of available services, such as database systems; application programs; and the like. The transaction processing system provides a way to interconnect applications and resource managers while maintaining data integrity and transactional consistency.

The application process initiating a transaction invokes various services and/or resource managers to perform various operations and tasks necessary to complete the transaction. All services and resource managers invoked to perform operations for the transaction register with a transaction manager, stating that they are joining the transaction. A transaction manager typically provides transaction management functions, such as monitoring the progress of the transaction and coordinating the commit processing and rollback of the transaction, and protects the integrity of user data. When all operations, or work, have completed, the initiating application process notifies the transaction manager of this fact. The transaction manager then initiates an agreement protocol to coordinate commitment processing among all services and resource managers (including foreign transaction managers) participating in the transaction. In transaction processing the standard agreement protocol is the two-phase commitment (2PC) protocol. A description of the 2PC protocol, as well as a detailed overview of transaction processing, is presented in J. Gray et al., *Transaction Processing Concepts and Techniques,* Morgan Kauffman, 1993, the contents of which are herein incorporated by reference.

Briefly, in phase one of the 2PC protocol, the transaction manager issues a request prepare signal to each participant (i.e., the transaction manager asks each participating service or resource manager if it believes the operations it performed to be a consistent and complete transformation). If any participant votes no, the commit fails and the transaction is aborted and rolled back; if all participating resource managers vote yes (ready to commit), the transaction is a correct transformation and phase two commences. In phase two of the 2PC protocol, the transaction manager issues a commit request signal informing each participant that the transaction is complete, and records this fact in the transaction's log. After all participants acknowledge the commit request, the transaction manager records this fact and forgets about the transaction.

Recently, a Transaction Internet Protocol (TIP) that uses the 2PC paradigm has been proposed by the Internet Engineering Task Force (IETF). Attached hereto, as Appendix A, is the final version of the IETF paper describing TIP and its requirements. The IETF paper describes a simple 2PC protocol applicable to transactions involving resources in a distributed, Internet-connected transaction. Basically, two models are described: a "Push" model and "Pull " model.

In the Push model, an application on a first transaction processing system requests that the transaction manager of that system "export " a transaction, T1, to a second transaction monitoring system to perform some work on behalf of the application. The transaction manager of the first system "pushes " transaction T1 to the second system by sending a message to the transaction manager of the second system. The message requests that the second system start a local transaction associated with transaction T1 as a subordinate of the first system, and return the name, for example "T2", for that local (imported) transaction branch on the second system together with the Internet address of the local transaction branch. The transaction manager forwards to the application the name, T2, and the internet address of the transaction on the second system associated with transaction T1. The application then sends a message to the desired application on the second system, asking it to "do some work, and make it part of the transaction that your transaction manager already knows of by the name of T2." Additionally, the first and second transaction managers each update a global map by associating the global transaction T1 initiated on the first system with the transaction branch T2. The global map is a data structure that is typically maintained by a transaction manager maintains in order to associate any and all remote transaction branches, such as T2, with associated global transactions, such as T1. Because the first system's transaction manager knows that it sent the transaction to the second system's transaction manager, the first system's transaction manager knows to involve the second system's transaction manager in the 2PC process.

In the Pull model, an application on the first system merely sends a message to an application on the second system, requesting that it "do some work, and make it part of a transaction that my transaction manager knows by the name of T1." The application on the second system then requests that its transaction manager enlist in the transaction T1. The second system's transaction manager "pulls "

transaction T1 over from the first system and initiates a local transaction, T2, associated with transaction T1. Also, both transaction managers update their system's global map. As a result of the pull, the first system's transaction manager knows to involve the second system's transaction manager in the 2PC process.

In both the push model and the pull model, it is a common occurrence for a transaction processing system or node to receive two different work requests associated with the same parent transaction. That is, two different transaction branches for the same parent transaction may be sent to the same node. For example, FIG. 1 shows a first transaction processing system 10 exporting a transaction branch for a first transaction T1 to both a second remote transaction processing node 20 and a third remote transaction processing node 30. In the TIP model, the work request sent to both remote nodes includes a TIP uniform resource locator (TIP URL) created by the transaction manager 15 of the exporting system. The TIP URL includes the internet address of the transaction T1, a global transaction identifier (G1), which uniquely identifies the transaction, and a local transaction identifier (L1). In most cases, because the transaction was initiated at first transaction processing node 10, L1 and G1 will have the same value.

Each remote node, upon receiving a work request from the first transaction processing system, will create a local transaction on behalf of the first (imported) transaction T1; second transaction processing system 20 will create a second local transaction, T2, identified by a global transaction identifier, G2, which is unique to the second node, and third transaction management system 30 will create a third local transaction, T3, identified by a global transaction identifier, G3, which is unique to the third node. Now suppose, for example, that an application process 25 on the second transaction processing system desires to send a work request to third (remote from the second) transaction processing system 30 to perform work on behalf of transaction T2. Second transaction processing system 20 will create a TIP URL that includes global transaction identifier G2 as well as a local transaction identifier L2. In this case, third transaction management system 30 will receive the work request and start another local transaction, T4, on behalf of (imported) transaction T2. Thus, in third remote transaction processing node 30, two different transaction branches, T3 and T4, will be created for the same parent transaction T1, because there is no way for the third node to know that transaction T2 is itself an imported transaction branch and is subordinate to T1.

SUMMARY OF THE INVENTION

The present invention provides systems and methods for ensuring that two different transactions will not be created at any given transaction processing node for the same parent transaction. In particular, the present invention provides techniques for identifying whether a transaction is an imported transaction, subordinate to a parent transaction, and if so, including the parent transaction's global transaction identifier when exporting transaction branches for the imported transaction.

According to the invention, upon receiving a work request from a remote transaction processing system, the local transaction manager creates a local subordinate transaction associated with the parent transaction. A local transaction identifier that identifies the local subordinate transaction is also created. The local identifier includes an indicator, such as a one-bit flag, which identifies the local subordinate transaction as an imported transaction. The global identifier for the parent transaction is stored to a map in association with the transaction identifier of the new local subordinate transaction. If a work request associated with an imported transaction is sent to a remote transaction processing system, the global transaction identifier of the parent transaction is retrieved from the map and included in the work request so that the system receiving the work request will know that it is associated with the parent transaction. In this manner, the receiving system will know not to start a new subordinate transaction on behalf of the parent transaction if a transaction subordinate to the parent transaction has already been started on that system.

According to an aspect of the invention, a transaction processing system communicably coupled to two or more remote transaction management nodes is provided. The system typically comprises a transaction manager (TM), wherein the TM receives a first request associated with a first transaction exported by a first remote transaction management node, wherein the first request has a first transaction identifier that includes a global transaction identifier (G1) associated with the first transaction, and wherein the TM creates a second transaction associated with the first transaction, the second transaction having an associated local transaction identifier (L2) that includes a flag indicating that the second transaction is associated with an imported transaction. The system also typically includes an application process that performs work for the second transaction, wherein when the application process desires to send a second request associated with the second transaction to a second remote node, the TM reads the flag in the second local transaction identifier (L2) and creates a second transaction identifier to be sent with the second request, wherein the second transaction identifier includes the first global transaction identifier (G1) and the second local transaction identifier (L2), such that when the second request is processed by the second remote node, the second remote node will know that the second transaction is associated with the first global transaction.

According to another aspect of the invention, a method is provided for communicating work requests associated with imported transactions to remote nodes in a transaction processing system communicably coupled to two or more remote transaction management nodes, wherein the processing system has a transaction manager (TM) and an application process. The method typically comprises the steps of receiving a first work request associated with a first transaction from a first remote transaction management node, wherein the first work request has a first transaction identifier that includes a global transaction identifier (G1) associated with the first transaction, and creating a second transaction associated with the first transaction, wherein the second transaction has an associated local transaction identifier (L2) that includes a flag indicating that the second transaction is associated with an imported transaction. When the application that is performing work for the second transaction desires to send a second work request associated with the second transaction to a second remote node, the method also typically comprises the steps of creating a second transaction identifier for the second transaction, wherein the second transaction identifier includes the first global transaction identifier (G1) and the second local transaction identifier (L2), and sending the second work request to the second remote node, wherein the second work request includes the second transaction identifier, such that when the second work request is processed by the second remote node, the second remote node will know that the second transaction is associated with the first global transaction.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DESCRIPTION OF THE SPECIFIC EMBODIMENTS

Figure 1:
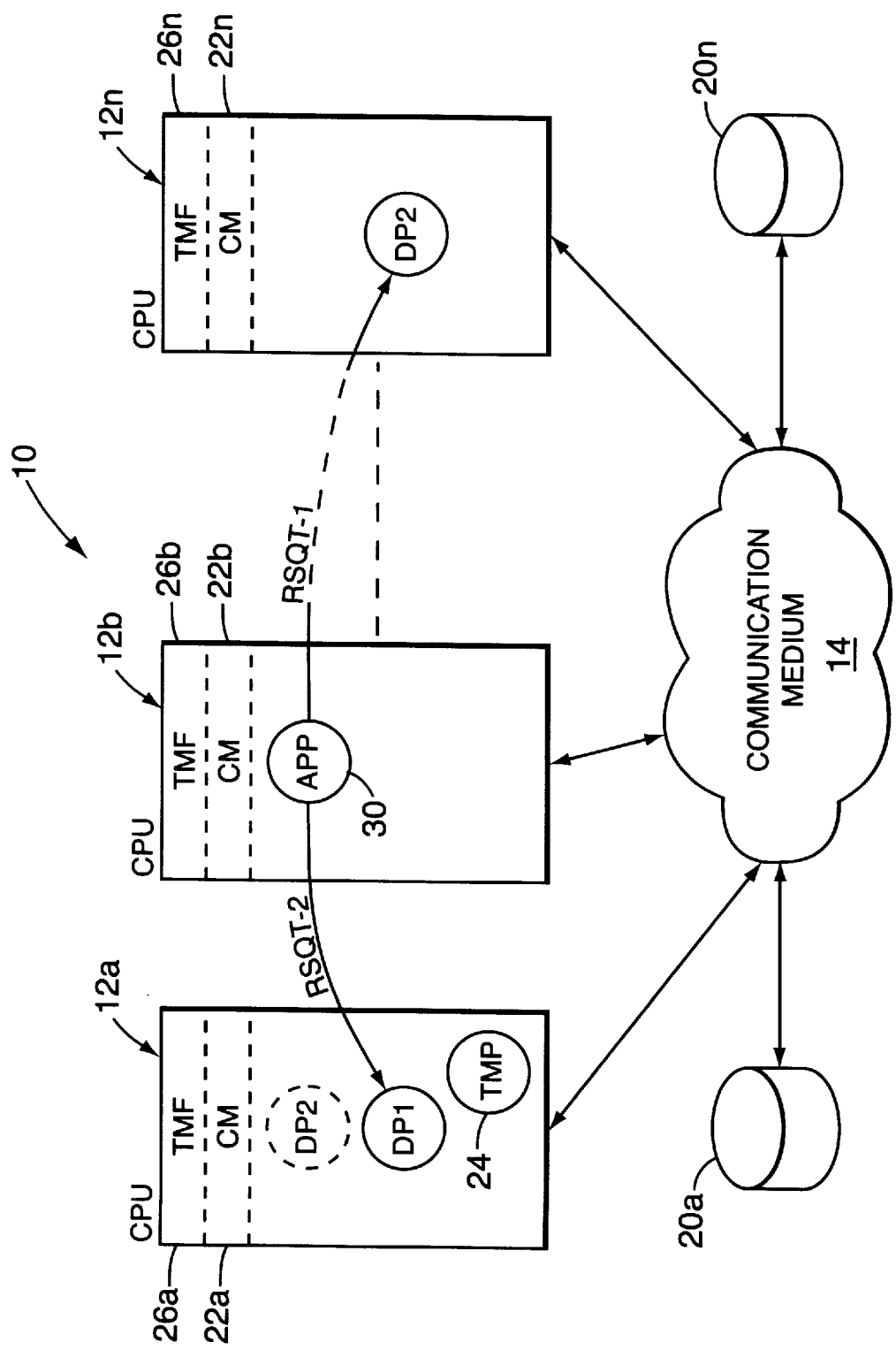
FIG. 1 is a block diagram that illustrates an example of a typical call structure for a transaction processing node that starts two different transaction branches for the same parent transaction.
Figure 2:
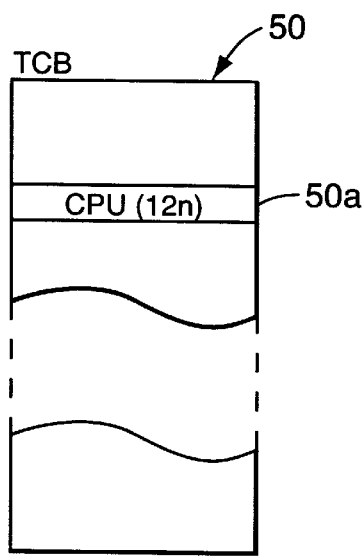
FIG. 2 is a block diagram that illustrates a typical call structure of an application invoking various resource managers and application services to execute a transaction that is spread among application programs (clients and servers) and resource managers.

FIG. 2 illustrates a typical call structure of an application process that is invoking various resource managers and application services to execute a transaction that is spread among-application programs (clients and servers) and resource managers according to the present invention. Transaction processing occurs in both centralized (local) systems and in distributed systems. The services and resource managers are invoked using local and/or remote procedure calls accordingly. Remote services and servers run in separate processes, such as on a remote computer system, while local services and servers run in the local computer system. In a localized transaction processing system, an application process accesses services by calling one or more local resource managers using a transactional procedure call. In a distributed transaction processing system, an application process accesses both local and remote services by calling one or more local resource managers, and/or one or more remote resource managers located at one or more remote processing nodes, or domains, using a transactional remote procedure call.

When an application process subcontracts part of a transaction to a foreign transaction management system it is commonly referred to as exporting a transaction branch. One or more transaction branches can be exported for a given transaction to one or more foreign transaction management systems. Similarly, a foreign transaction management system can start a transaction and subcontract part of the transaction to the local transaction management system. This is commonly referred to as importing a transaction branch.

Figure 3:
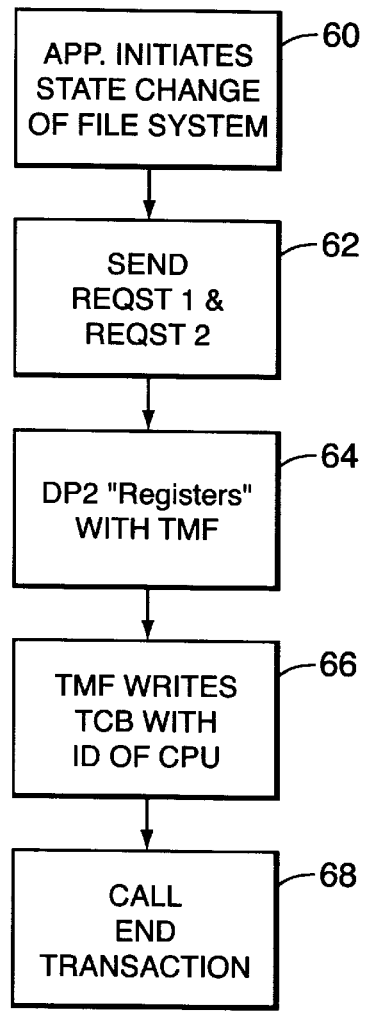
FIG. 3 is a block diagram that illustrates the basic components of a heterogeneous transaction processing system according to the present invention.

A typical transaction management system includes one or more applications, one or more resource managers including communication resource managers, and a transaction manager. The transaction manager provides transaction management functions, such as monitoring the progress of the transaction and coordinating the commitment processing (or agreement protocol) and rollback of the transaction, and protects the integrity of user data. An application process calls transaction services in the transaction manager to begin and end transactions. As part of a transaction, an application process accesses services by calling one or more local resource managers, and invokes remote services through one or more communication resource managers. A communication resource manager (CRM) encodes the transactional semantics of a foreign transaction management system and acts as a gateway to foreign transaction management domains. A CRM interfaces between the local transaction management system and a foreign transaction management domain. The process environment in which a CRM executes is called a gateway process, or simply "gateway". The gateway exports and imports transaction branches allowing foreign transaction managers to participate in the agreement protocol with the local transaction manager. FIG. 3 illustrates the basic components of such a heterogeneous transaction processing system according to the present invention. As shown, local transaction management domain 20 includes transaction manager 10, gateway processes 12 and 14, and an application process 16. Transactions are imported and exported to and from foreign transaction management domains 30 and 40 through gateway processes 12 and 14, respectively.

Figure 4:
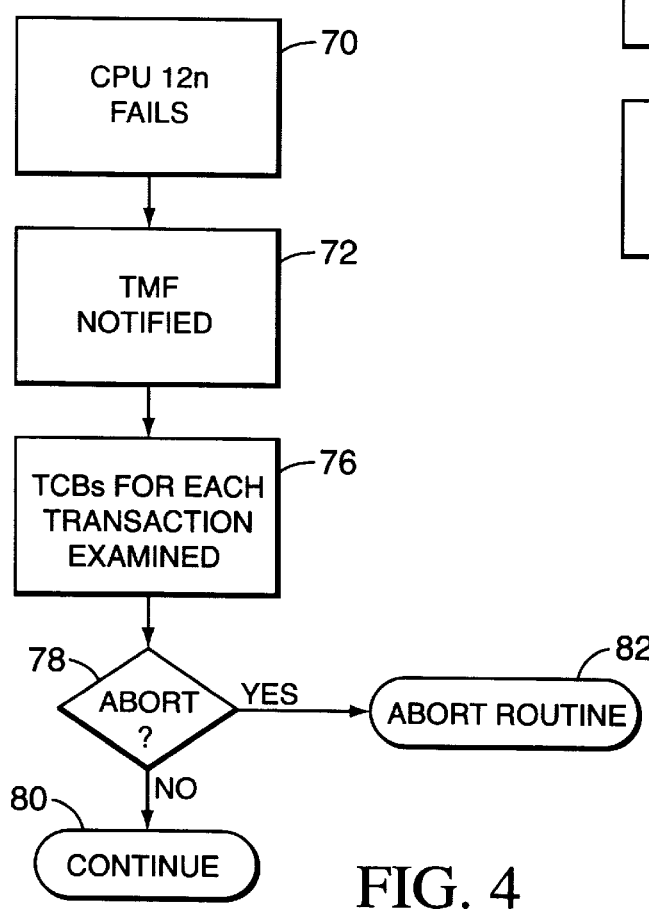
FIG. 4 is a block diagram that illustrates a call structure associated with exporting a transaction branch for an imported transaction according to an embodiment of the present invention.
Figure 2:
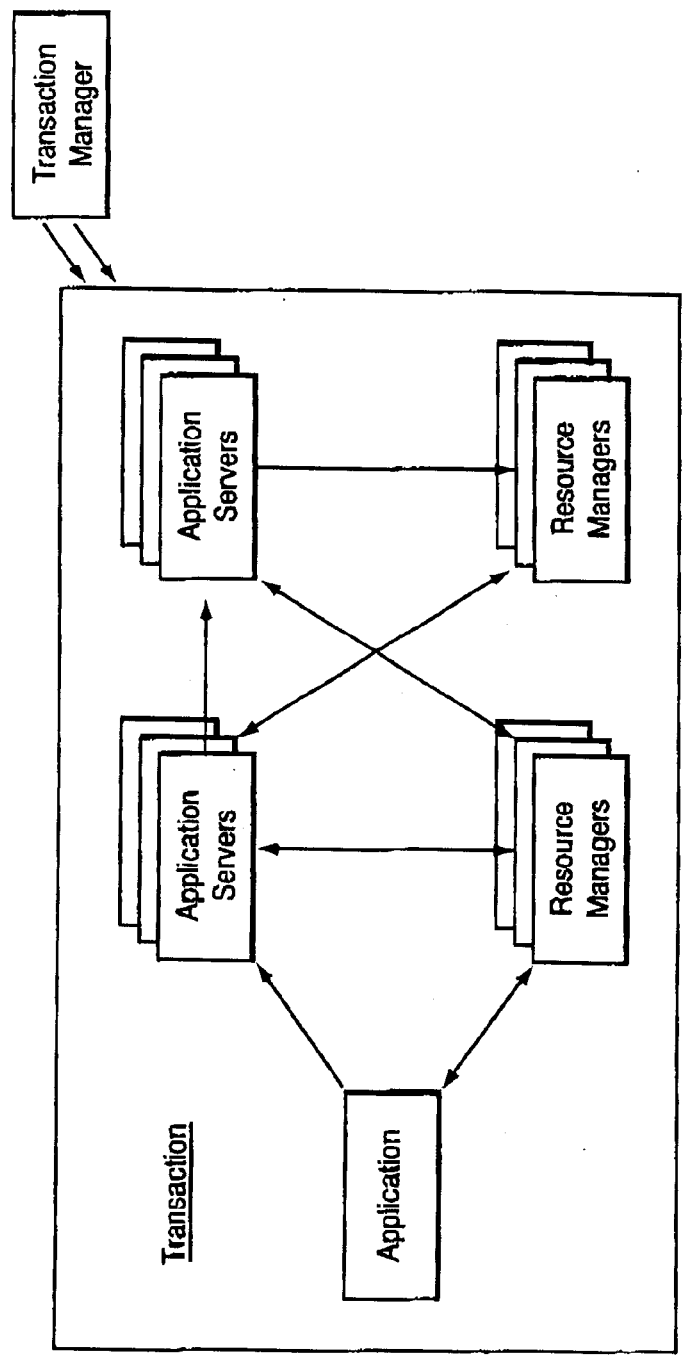
Figure 3:
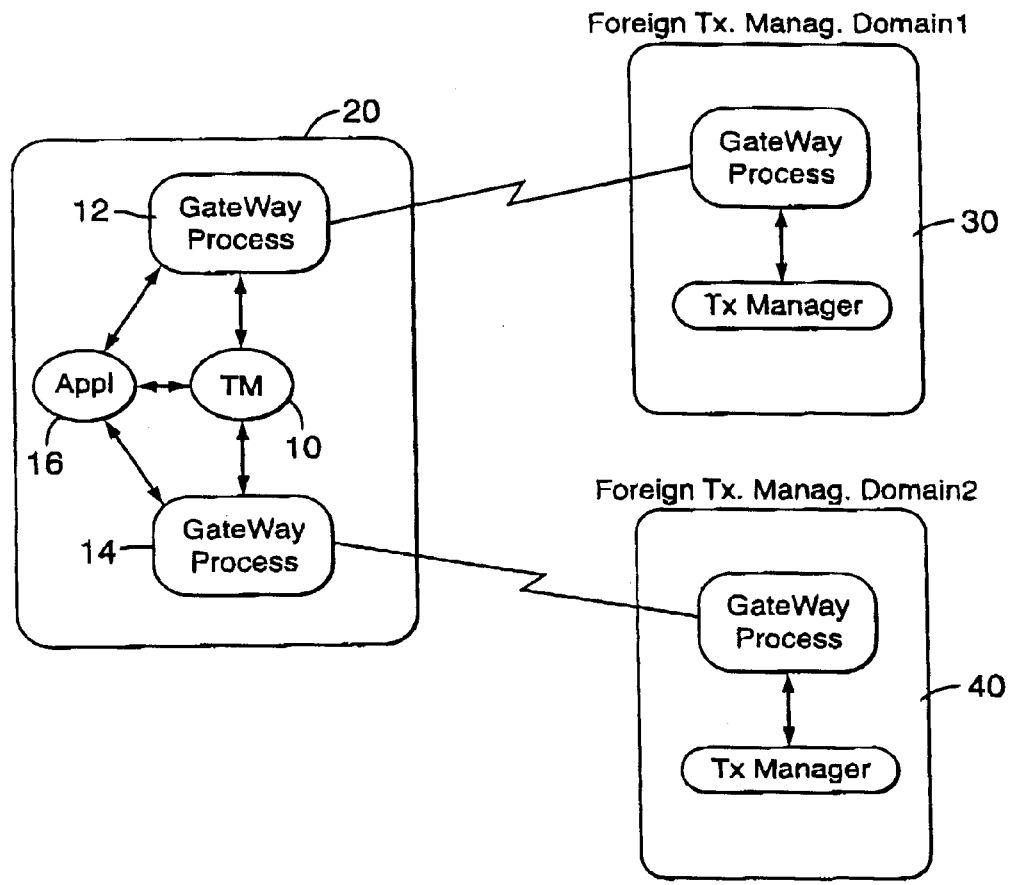
Figure 4:
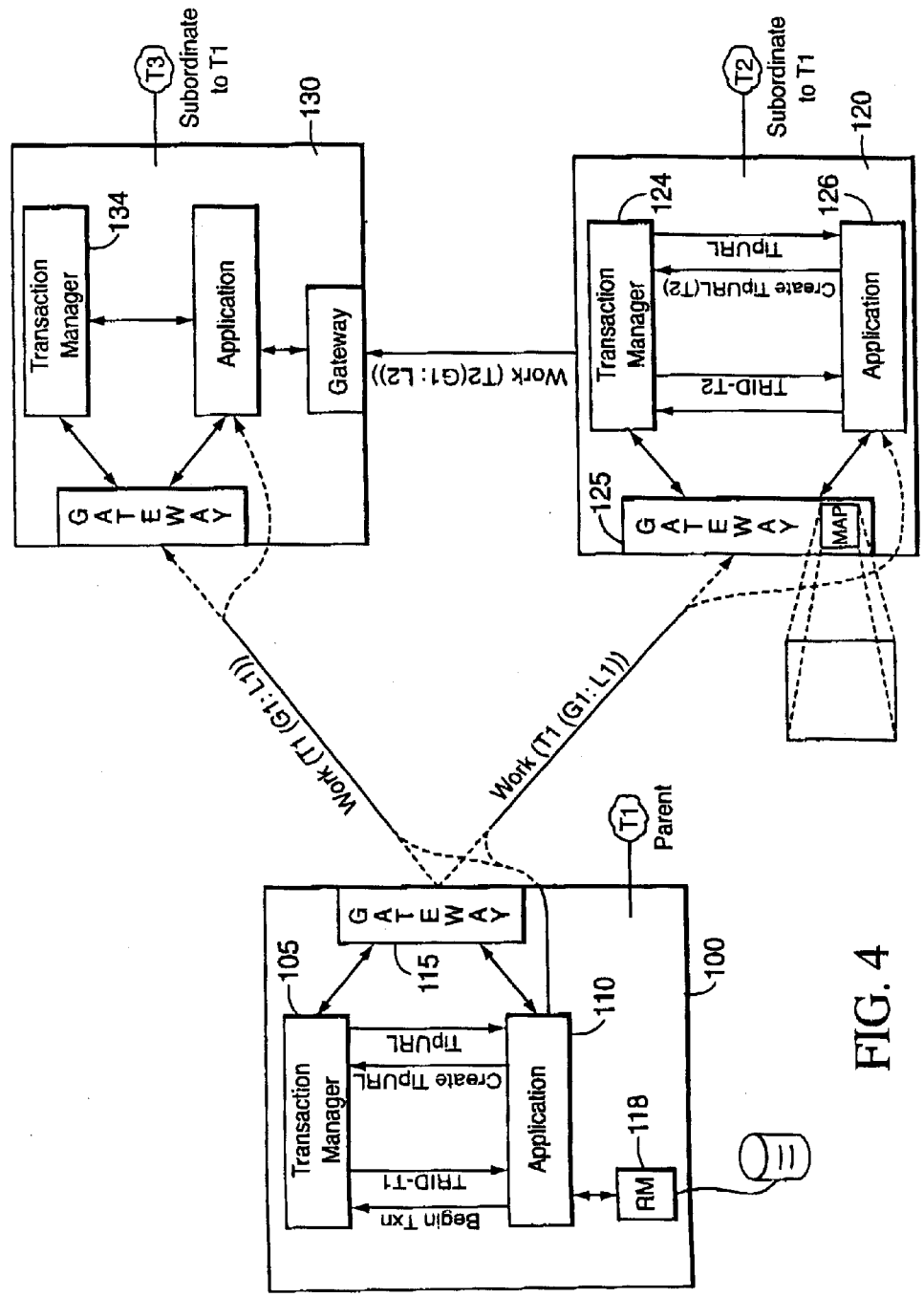

FIG. 4 illustrates the call structure associated with exporting a transaction branch for an imported transaction according to an embodiment of the present invention. Transaction processing system 100 includes a transaction manager 105, an application process 110 and a gateway 115. Application process 110 initiates a transaction by calling transaction services in Transaction manager 105, for example, by issuing a Begin_Work( ) request to transaction manager 105, thereby registering with transaction manager 105. Transaction manager 105 begins a transaction, T1, creates a unique transaction identifier (TRID), TRID-T1, which is used to identify that particular transaction, and responds to application process 110 with the transaction identifier, TRID-T1. Once application process 110 has started the transaction (the transaction has been registered with transaction manager 105), it invokes resource managers by sending work requests to remote (foreign) services and local services such as resource manager 118, which is coupled to a service or resource, such as a database. Application process 110 interacts with transaction manager 105 and gateway process 115 to export transaction branches to foreign transaction management systems, such as second transaction system 120 and third transaction processing system 130.

When application process 110 desires to export a transaction branch to a remote transaction processing system, application 110 requests from transaction manager 105 an identification of the transaction to be exported (e.g., T1), including identification of the owner of that transaction (i.e., local transaction management domain 100) in the form of a TIP uniform resource locator (URL). In preferred aspects, the TIP URL includes the transaction identifier, TRID. In one embodiment, the TIP URL for transaction T1 includes a global transaction identifier, G1, and a local transaction identifier, L1. In this embodiment, the TIP URL preferably takes on the form of: tip://<endpoint>/<G:L1>, where <endpoint> includes the internet address of the system that created the TIP URL, in this case transaction processing system 100. In the present example, G1 and L1 have the same value, namely TRID-T1.

Application 110 establishes an internet connection with remote transaction systems 120 and 130. Each work request sent to the remote system includes a work instruction and the TIP URL, denoted T1(G1:L1) in FIG. 4. At the same time application 110 may initiate work on its own system by issuing a work request to local resource manager 118. When the work requests are received by remote systems 120 and 130, each system creates a local subordinate transaction on behalf of transaction T1; second transaction processing system 120 creates transaction T2, and third transaction processing system 130 creates transaction T3.

If the work request is received by an application process at the remote transaction processing system, the receiving application process passes it with an appropriate call (i.e., pull call) to the system's transaction manager. The remote transaction manager, in response, creates a local transaction identified by a transaction identifier, e.g., TRID-T2 or TRID-T3, under which work at the remote node will be tracked, and sends a pull request to transaction manager 105. The remote transaction manager also creates a control block data structure where it stores information about the local transaction, e.g., T2 or T3, including its association with transaction T1. Transaction manager 105 does the same so that it knows to include the remote system's transaction manager in the 2PC protocol.

If the transaction is pushed to a remote node, the transaction manager at the remote transaction processing system receiving the push request will retrieve the TIP URL. The remote transaction manager, in response, creates a local transaction identified by a transaction identifier, e.g., TRID-T2 or TRID-T3, under which work at the remote node will be tracked, and responds to transaction manager 105 with a push response. The remote transaction manager also creates a control block data structure where it stores information about the local transaction, e.g., T2 or T3, including its association with transaction T1. Transaction manager 105 does the same so that it knows to include the remote system's transaction manager in the 2PC protocol.

Focusing now on second transaction processing system 120, when the work request (push or pull case) is received from transaction processing system 100, transaction manager 124 creates transaction T2. According to one embodiment, when transaction manager 124 creates transaction T2, an indicator, such as a flag, is included in the transaction identifier TRID-T2 that indicates that transaction T2 is an imported transaction. Transaction manager 124 recognizes that T2 is an imported transaction by virtue of the work request that is received from transaction processing system 100 and for which transaction T2 was created. In preferred aspects, the flag is a one-bit field in the multiple-bit transaction identifier field.

Additionally, in one embodiment, gateway process 125 includes a map for storing local transaction identifiers in association with global transaction identifiers of imported transactions. For example, G1 (here TRID-T1) is stored in the map, and when transaction T2 has been created, TRID-T2 is stored in the map in association with global identifier G1. Thus, the map stores an entry of the relationship between a parent transaction (e.g., T1) and its associated local subordinate transaction (e.g., T2).

In the course of performing work for transaction T2, it may be necessary for second transaction processing system 120 to export a transaction branch to another remote transaction processing system. For example, application process 126 while performing work for T2 may desire to send a work request to third transaction processing system 130. Accordingly, application 126 requests from transaction manager 124 a TIP URL identifying transaction T2. Transaction manager 124 reads TRID-T2 and sees the indicator (e.g., a flag) identifying transaction T2 as an imported transaction branch and subordinate to T1. Transaction manager 124 then goes to the gateway 125 and retrieves the global transaction identifier of the parent transaction associated with transaction T2, namely G1. At this point, rather than including a global transaction identifier G2 and a local transaction identifier L2 identifying transaction T2 in the TIP URL (i.e., tip://<endpoint>/<G2:L2>), transaction manager 124 includes global transaction identifier G1 of the parent transaction T1 and local transaction identifier L2 of the local subordinate transaction T2: tip://<endpoint>/<G1:L2>, where G1 has the value TRID-T1 and L2 has the value TRID-T2.

Upon receiving the work request from transaction processing system 120, including the TIP URL, the application asks transaction manager 134 to pull the transaction (tip://<endpoint/<G1:L2>). Transaction manager 134 checks its data structures and sees that a local subordinate transaction, T3, has already been started on behalf of T1 (identified by global transaction identifier G1). Rather than starting a new local subordinate transaction, say T4, transaction manager 134 returns transaction T3.

In this manner, the present invention allows for efficient communication of work requests to remote transaction processing systems while providing a technique that helps prevent more than one subordinate transaction from being started at any transaction processing system for the same parent transaction.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

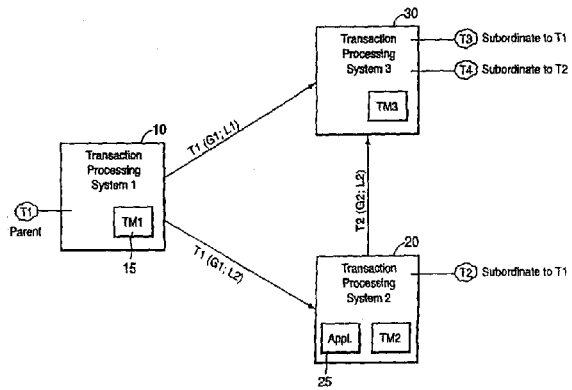

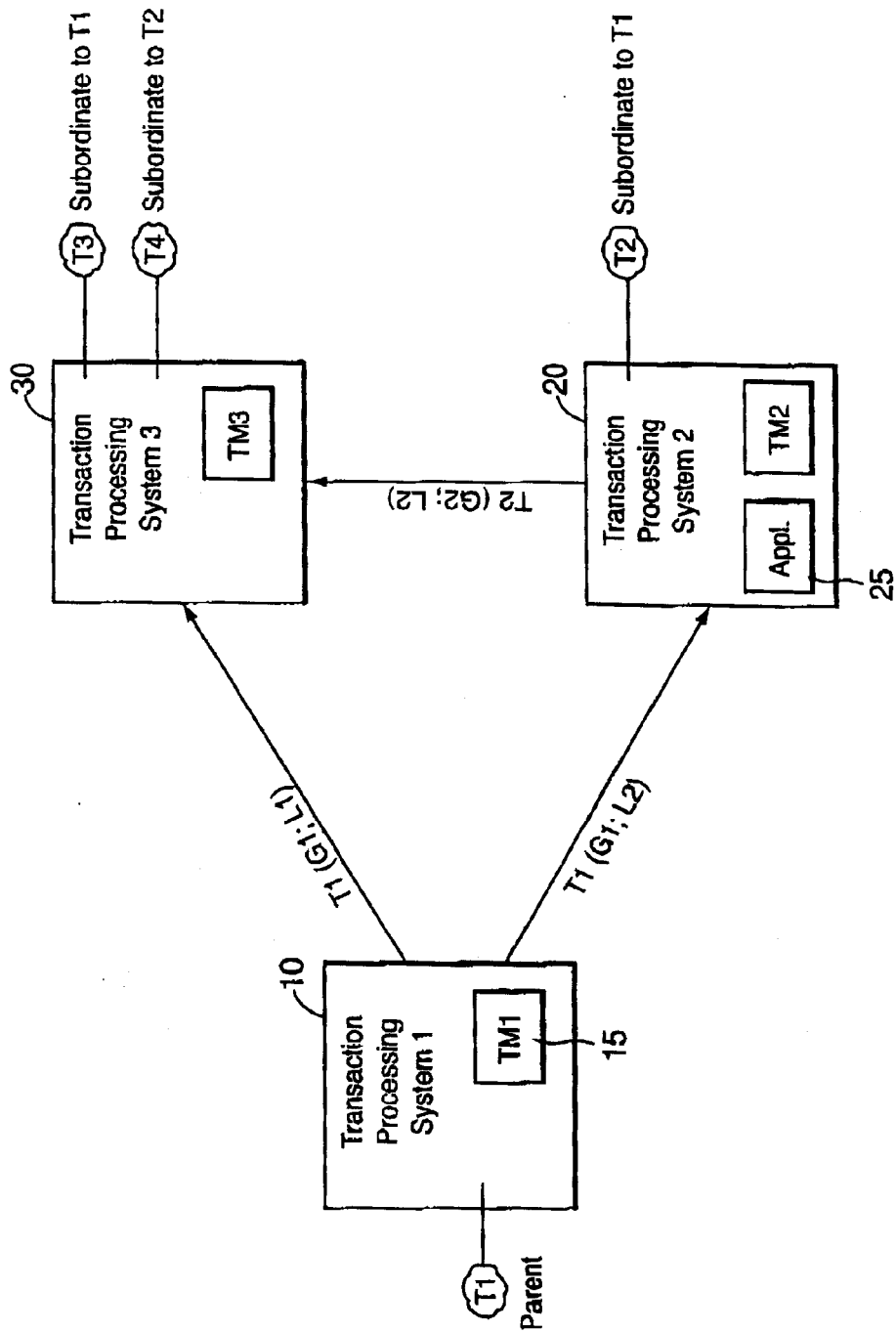

What is claimed is:

1. A transaction processing system communicably coupled to two or more remote transaction management nodes, the system comprising:

a transaction manager (TM), wherein the TM receives a first request associated with a first transaction exported by a first remote transaction management node, wherein the first request has a first transaction identifier that includes a global transaction identifier (G1) associated with the first transaction, wherein the TM creates a second transaction associated with the first transaction, the second transaction having an associated local transaction identifier (L2) that includes a flag indicating that the second transaction is associated with an imported transaction; and an application process that performs work for the second transaction, wherein when the application process desires to send a second request associated with the second transaction to a second remote node, the TM reads the flag in the second local transaction identifier (L2) and creates a second transaction identifier to be sent with the second request, wherein the second transaction identifier includes the first global transaction identifier (G1) and the second local transaction identifier (L2), such that when the second request is processed by the second remote node, the second remote node will know that the second transaction is associated with the first transaction.

2. The system of claim 1, further comprising a gateway process for communicating with remote nodes, the gateway process including a map for storing local transaction identifiers in association with global transaction identifiers, wherein said gateway process stores (G1) to the map, and wherein after the TM has created the second transaction, the gateway process stores (L2) to the map in association with (GI).

3. The system of claim 2, wherein the TM retrieves (G1) from the gateway process when creating the second transaction identifier to be sent with the second request.

4. The system of claim 1, wherein the first and second transaction identifiers are TIP uniform resource locators.

5. The system of claim 1, wherein the flag comprises a one bit field.

6. The system of claim 1, wherein the first request comprises a push request received from the first remote node.

7. The system of claim 1, wherein the first request comprises a pull request received from the application process.

8. A method of communicating work requests associated with imported transactions to remote nodes in a transaction processing system communicably coupled to two or more remote transaction management nodes, the processing system having a transaction manager (TM) and an application process, the method comprising the steps of:

receiving a first work request associated with a first transaction from a first remote transaction management node, the first work request having a first transaction identifier that includes a global transaction identifier (G1) associated with the first transaction;

creating a second transaction associated with the first transaction, the second transaction having an associated local transaction identifier (L2) that includes a flag indicating that the second transaction is associated with an imported transaction;

performing work for the second transaction by the application process;

creating a second transaction identifier for the second transaction when the application process desires to send a second work request associated with the second transaction to a second remote node, the second transaction address including the first global transaction identifier (G1) and the second local transaction identifier (L2); and sending the second work request to the second remote node, wherein the second work request includes the second transaction identifier, such that when the second work request is processed by the second remote node, the second remote node will know that the second transaction is associated with the first transaction.

9. The method of claim 8, wherein the transaction processing system includes a gateway process for communicating with remote nodes, wherein the gateway process has a map for storing local transaction identifiers in association with global transaction identifiers, the method further including the step of:

storing the first global transaction identifier to the map when the first work request is received.

10. The method of claim 9, further including the step of storing the second local transaction identifier (L2) to the map in association with (G1).

11. The method of claim 9, wherein the TM creates the second transaction identifier, wherein the step of creating the second transaction identifier includes the step of retrieving the first global transaction identifier (G1) from the map.

12. The method of claim 8, wherein the first work request is a push request which is received by the TM.

13. The method of claim 8, wherein the first work request is received by the application process, the method further comprising the step of:

sending a pull call from the application process to the TM.

14. The method of claim 8, wherein the flag comprises a one bit field.

15. The method of claim 8, wherein the first and second transaction identifiers are TIP uniform resources locators.

* * * * *

UNITED STATES PATENT AND TRADEMARK OFFICE
CERTIFICATE OF CORRECTION

PATENT NO.    : 6,295,548 B1
DATED         : September 25, 2001
INVENTOR(S)   : Johannes Klein It is certified that error appears in the above-identified patent and that said Letters Patent is hereby corrected as shown below:

<u>Title page,</u>
The title page should be deleted and substitute therefore the attached Title page.

<u>Drawings,</u>
Delete Drawing Sheets 1-4, and substitute therefore the Drawing Sheets, consisting of FIGS. 1-4, as shown on the attached pages.

Signed and Sealed this

Ninth Day of July, 2002

Attest:

Attesting Officer

JAMES E. ROGAN
*Director of the United States Patent and Trademark Office*

(12) United States Patent
Klein et al.

(10) Patent No.: US 6,295,548 B1
(45) Date of Patent: Sep. 25, 2001

(54) DETECTION OF AN IMPORTED TRANSACTION FOR FINDING THE GLOBAL TRANSACTION IDENTIFIER

(75) Inventors: Johannes Klein, San Francisco; Albert C. Gondi, Santa Clara; Roger J. Hansen, San Francisco, all of CA (US); Sitaram V. Lanka, Mercer Island, WA (US)

(73) Assignee: Compaq Computer Corporation, Houston, TX (US)

(*) Notice: Subject to any disclaimer, the term of this patent is extended or adjusted under 35 U.S.C. 154(b) by 0 days.

(21) Appl. No.: 09/267,844

(22) Filed: Mar. 12, 1999

(51) Int. Cl.$^7$ .................................. G06F 9/00; G06F 17/00
(52) U.S. Cl. ........................ 709/101; 707/10; 707/200; 707/511
(58) Field of Search .......................... 707/10, 200, 511; 709/101, 202

(56) References Cited

U.S. PATENT DOCUMENTS

| | | | |
|---|---|---|---|
| 4,228,496 | | 10/1980 | Katzman et al. ............... 364/200 |
| 4,817,091 | | 3/1989 | Katzman et al. ............... 371/9 |
| 5,319,774 | * | 6/1994 | Ainsworth et al. ............. 714/20 |
| 5,504,899 | * | 4/1996 | Raz ........................... 707/10 |
| 5,504,900 | * | 4/1996 | Raz ........................... 707/10 |
| 5,680,610 | * | 10/1997 | Smith et al. .................. 707/10 |
| 5,751,932 | | 5/1998 | Horst et al. .................. 395/182.1 |
| 5,835,766 | * | 11/1998 | Iba et al. .................... 709/104 |
| 5,920,863 | * | 7/1999 | McKeehan et al. ............. 707/10 |
| 5,923,833 | * | 7/1999 | Freund et al. ................ 707/202 |
| 6,101,527 | * | 8/2000 | Lejeune et al. ............... 709/201 |
| 6,115,711 | * | 9/2000 | White ........................ 707/10 |
| 6,205,464 | * | 3/2001 | Cobb et al. .................. 709/101 |
| 6,209,038 | * | 3/2001 | Bowen et al. ................. 709/238 |

OTHER PUBLICATIONS

Jim Gray, et al.; Transaction Processing: Concepts and Technique; Morgan Kauffman; 1993; pp. v–xxxii.

* cited by examiner

*Primary Examiner*—Krisna Lim
(74) *Attorney, Agent, or Firm*—Leah Sherry; Oppenheimer, Wolff & Donnelly LLP

(57) ABSTRACT

Systems and methods for ensuring that two different subordinate transactions will not be created at any given transaction processing node for the same parent transaction. Upon receiving a work request from a remote transaction processing system, the local transaction manager creates a local subordinate transaction associated with the parent transaction. A local transaction identifier that identifies the local subordinate transaction is also created. The local identifier includes an indicator, such as a one-bit flag, which identifies the local subordinate transaction as an imported transaction. The global identifier for the parent transaction is stored to a map in association with the transaction identifier of the new local subordinate transaction. If a work request associated with an imported transaction is sent to a remote transaction processing system, the global transaction identifier of the parent transaction is retrieved from the map and included in the work request so that the receiving system will know that the work request is associated with the parent transaction. In this manner, the receiving system will know not to start a new subordinate transaction on behalf of the parent transaction if a transaction subordinate to the parent transaction has already been started on that system.

15 Claims, 4 Drawing Sheets